United States Patent [19]
Miyamae

[11] 3,958,769
[45] May 25, 1976

[54] SPOOL MOUNTING MECHANISM IN A FISHING REEL

[76] Inventor: Toshiaki Miyamae, 2-16, 2-chome, Nishi-Iwata, Higashi-Osaka, Osaka, Japan

[22] Filed: July 1, 1974

[21] Appl. No.: 484,589

[52] U.S. Cl. .............................................. 242/84.1 R
[51] Int. Cl. ............................................... A01k 89/00
[58] Field of Search .................. 242/84.1 R, 84.2 B, 242/84.5 R, 84.51 R

[56] References Cited
UNITED STATES PATENTS

| | | | |
|---|---|---|---|
| 2,018,468 | 10/1935 | Pflueger | 242/84.1 R |
| 2,448,610 | 9/1948 | Mandolf | 242/84.1 R |
| 3,053,469 | 9/1962 | King | 242/84.2 B |

*Primary Examiner*—Billy S. Taylor
*Attorney, Agent, or Firm*—Moonray Kojima

[57] ABSTRACT

In a mechanism for mounting a spool to a fishing reel, a rotary shaft for rotating the spool is formed at one side with a small diameter shaft portion, and an annular groove adapted to be held by a resilient forked pin detachably engaged with a supporting member for supporting said rotary shaft. Near the center of the pin and between the pin's forked elements is held a cam movably connected to a lever operable from the supporting member so that when the cam is moved by operating the lever, the pin is forced to extend outwardly so as to release the engaged relation of the pin with the thread whereby the spool is easily dismounted from the rotary shaft. The extremity of the rotary shaft is formed into a tapered portion which can, when pressed, extend outwardly the forked elements of the pin until the elements fall into the thread and hold the same therebetween whereby a new spool is easily mounted to the rotary shaft.

2 Claims, 5 Drawing Figures

SPOOL MOUNTING MECHANISM IN A FISHING REEL

The present invention relates generally to improvements in a device for mounting a spool to a fishing reel, and more particularly to a mechanism whereby the spool can be easily mounted to the reel and held in position against the vibrations of the spool rotating.

In order to enjoy a big catch of fish, it is necessary for fishermen to use a fishing line suitable to the kind and size of fish swimming in shoals. Thus most of the conventional fishing reels are so adapted that a spool wound with a desired fishing line is selectively mountable to a rotary shaft through a fixture means screwably tightened to a screw thread engraved on the outer periphery of the shaft portion.

According to the above-mentioned conventional fishing reels, the mounting of a desired spool to the fishing reel is easily effected by use of the aforesaid fixture means, but there still remain disadvantages that the fixture means thus screwably tightened to the shaft portion is subjected to the vibrations of the spool shaft when the latter is rotated, consequently the tightened relation of the spool to the shaft portion is screwably loosened to finally cause the spool to come off the reel.

Accordingly, the present invention has been made to eliminate the above-mentioned drawbacks and disadvantages, and has as one of its main objects the provision of a fishing reel having a mechanism wherein a desired spool can be selectively mounted to a rotary shaft of the spool in a very easy manner.

Another object of the invention is to provide a fishing reel having a construction wherein a desired spool mounted to the rotary shaft can be supported in position without being subjected to any vibrations caused to the spool when it is rotated.

A further object of the invention is to provide a fishing reel wherein a spool mounted to the rotary shaft is rotated through a particular driving power transmission mechanism.

These and other objects, features and advantages of the invention will become apparent in the following description and claims made in conjunction with the accompanying drawings, in which:

Figure 1:
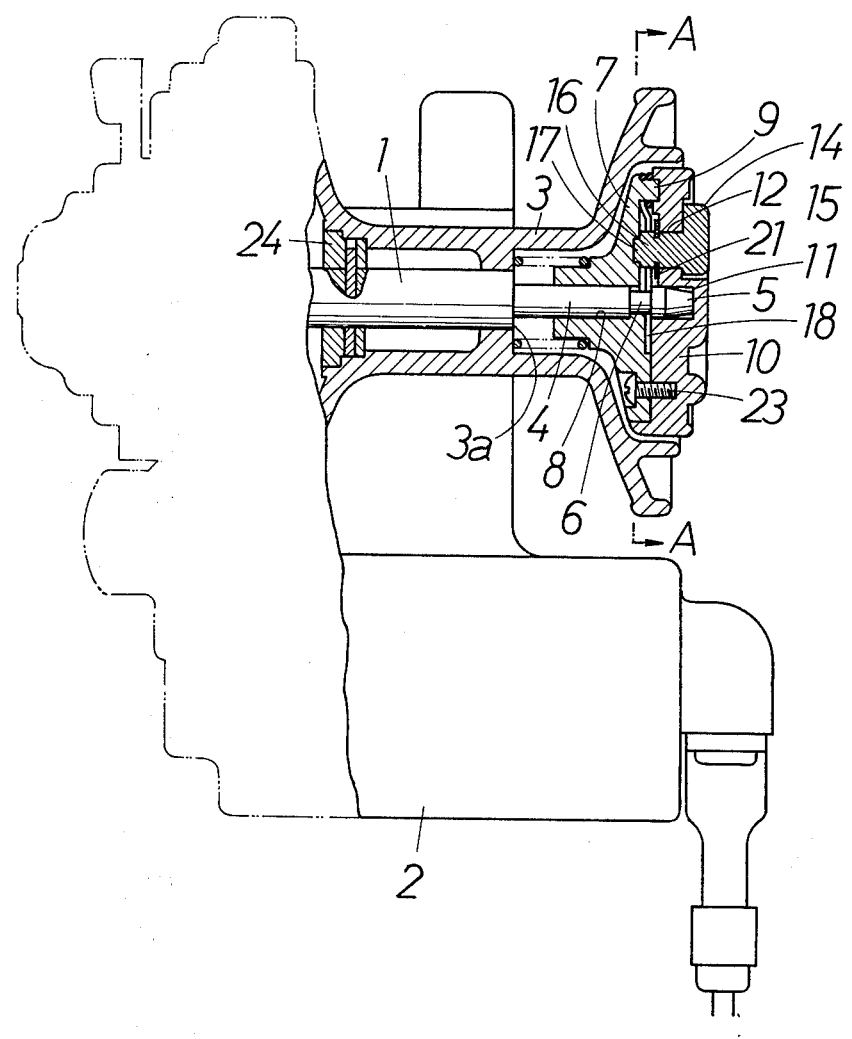
FIG. 1 is a partially cutaway vertical cross-sectioned elevation view showing a fishing reel wherein a spool is mounted to a rotary shaft by means of a mounting device in accordance with the present invention.
Figure 2:
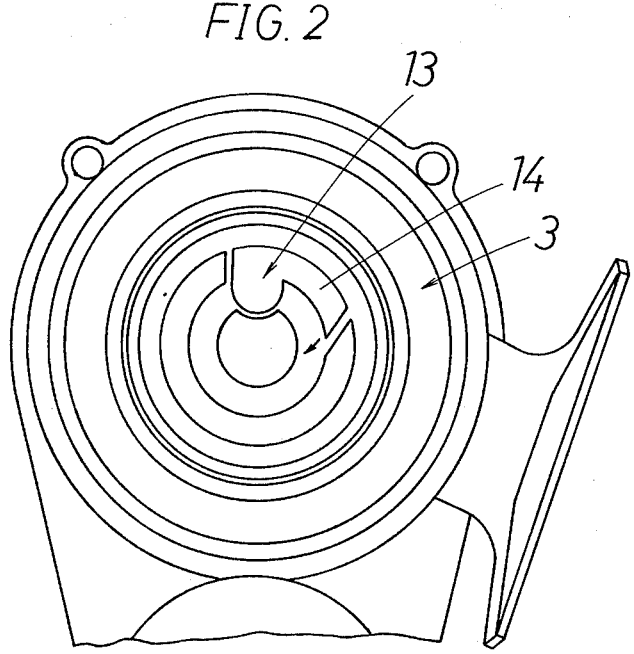
FIG. 2 is a side elevation view thereof.

Referring now to the accompanying drawings, and first more particularly to FIG. 1, reference numeral 1 designates a rotary shaft adapted to be driven by a rotary power from an electric motor 2 through a rotary power transmission mechanism. Said rotary shaft 1 is provided with a spool 3 rotatable by means of, and in synchronism with, said rotary shaft 1. At one side of said rotary shaft 1 (or the right hand side with respect to FIG. 1) there is formed a small diameter rotary shaft portion 4 having a tapered extremity 5. Further said rotary shaft 1 is engraved circumferentially with a groove 6 between said small diameter rotary shaft portion 4 and said tapered extremity 5. A rotary shaft supporting member 7 for supporting said rotary shaft 1 is bored in its center with a perforated hole 8 into which said small diameter rotary shaft portion 4 of the rotary shaft 1 is inserted. Outwardly from said supporting member 7 is protruded a circular shape cross sectioned projection 9. The spool 3 is mounted to said rotary shaft 1 by means of a mounting or fixing device 10 which is provided with a blind hole 11 for rotatably supporting said small diameter rotary shaft portion 4 and with a through hole 12 formed close to said blind hole 11. An operating lever 13 is inserted into said through hole 12 so as to operate the spool 3 to be rotated by means of the rotary shaft 1. Said operating lever 13 comprises an operating portion 14 exposed on the outer surface of said mounting device 10 as shown in FIG. 2, a lever shaft portion 15 inserted into the through hole 12 of said device 10, a cam 16 movably connected to said lever shaft portion 15 and a small diameter lever shaft portion 17 movably connected to said cam 16.

Figure 3:
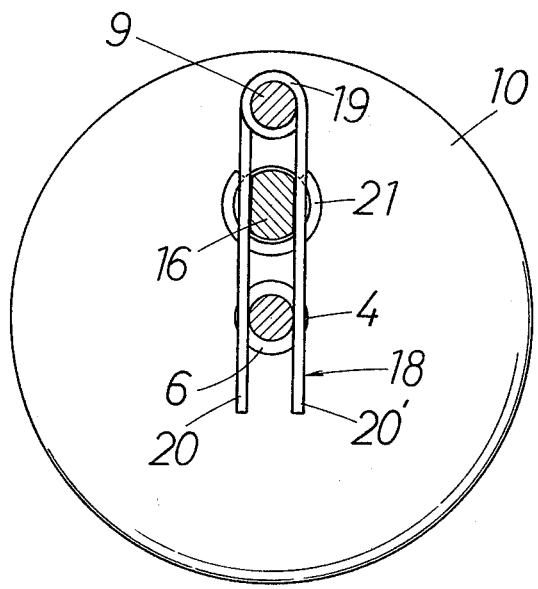
FIG. 3 is an enlarged cross-sectioned elevation view taken on the line A — A thereof.
Figures 4, 5:
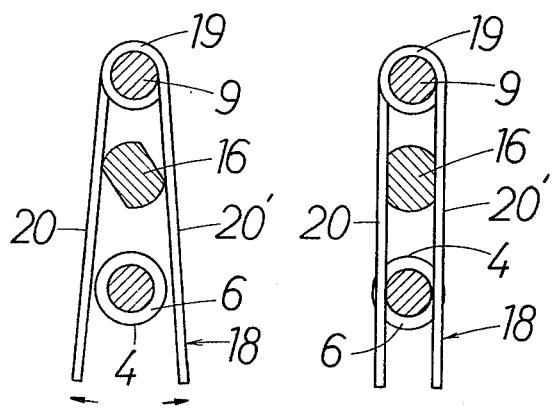
FIG. 4 is likewise an enlarged cross-sectioned elevation view showing how the resilient holding device is normally positioned when a cam of the invention is held thereby.
FIG. 5 is, similarly to FIG. 4, an enlarged cross-sectioned elevation view showing how the resilient holding device is outwardly extended by moving the cam.

As is clearly shown in FIGS. 3 to 5, said groove 6 is resiliently held by means of a spring 18 which comprises a substantially round shape eyelet member 19 having an inner circumference corresponding to the outer circumference of said projection 9 and a pair of leg members 20, 20 having a same length and extending in parallel relation with one another integrally from the eyelet member 19.

For a fuller understanding, said eyelet member 19 of the spring 18 is put on the projection 9 in order to hold the groove 6 between said pair of leg members 20, 20 opposite to the eyelet member 11. In this case, the cam 16 is also held between the leg members 20, 20 is a position close to the center thereof. Between the operating lever 13 and the mounting device 10 there is provided a snap ring 21 serving to prevent the lever 13 from coming off the device 10. A coil spring 22 is resiliently held between recessed base 3a of the spool 3 and notched portion 7a of the rotary shaft supporting member 7 as shown clearly in FIG. 1 thereby to normally press the supporting member 7 outwardly. Said supporting member 7 and said mounting device 10 are tightened together by means of a screw 23.

In order to limit the positional relation of the spool 3 to the rotary shaft 1, a limiting plate 24 is inserted onto the rotary shaft 1 and fixed thereto by means of a pin 25, thereafter being fitted to a recessed portion 26 formed in the same shape as the limiting plate 24.

By use of the spool mounting mechanism thus formed, the spool 3 is removed from the rotary shaft 3 in the following manner. In the first place, the operating lever 13 exposed outwardly of the mounting device 10 is somewhat moved by a finger so as to move the cam 16 movably connected to the lever. By this movement of the cam 16, the leg members 20, 20 of the spring 18 are forcibly extended outwardly (in the directions shown by the arrows in FIG. 4) so that the leg members 20, 20 positioned in the groove 6 of the small diameter portion 4 of the rotary shaft 1 are caused to come off the groove 6, consequently being released from their engagement with the rotary shaft supporting member 7. Thus the mounting device 10 integrated with the rotary shaft supporting member 7 by means of the screw 23 is also removed from the rotary shaft 1 together with the supporting member 7, thereafter the spool 3 being taken off the rotary shaft 1.

In this case, the cam 16 that has been somewhat moved as has been mentioned just above is returned to its original position by the dynamical stability of the leg members 20, 20. In order that a new spool inserted onto the rotary shaft 1 is rigidly fixed to the rotary shaft 1 by means of the mounting device 10, the small diameter rotary shaft portion 4 of the rotary shaft 1 is first inserted into the perforated hole 8 of the supporting member 7 until the foremost end of the portion 4 is brought into contact with the leg members 20, 20. Said portion 4 is further forcibly pressed to cause the tapered extremity 5 of the portion 4 to extend the leg members 20, 20 outwardly. When the leg members 20, 20 are brought in the groove 6, they return to their respective original position thereby finishing the mounting operation of the mounting device 10 to the rotary shaft 1.

Though one specific embodiment of the present invention has been shown and described herein, it will be apparent to those skilled in the art that the invention is not restricted to the details set forth but many changes and modifications may be made without departing from the spirit and scope of the invention as defined in the annexed claims.

What is claimed is:

1. A spool mounting device for fishing reel having a rotary shaft and spool detachably mounted on said shaft, said device comprising
   a. said shaft having a small diameter portion, a reduced neck portion and at the end thereof a tapered portion;
   b. first means having a projection, disposed toward the said tapered end of said shaft and held rotatably thereby;
   c. second means held by said first means for suitably mounting said spool on said shaft;
   d. resilient means having one end engaged with said projection of said first means and the other end having a pair of legs extending substantially parallel to each other from said one end, said other end normally holding said reduced neck portion of said shaft thereby to detachably fix said first means to said second means;
   e. operating lever means disposed on said second means;
   f. cam means movably connected to said operating lever means and positioned between said shaft and said one end of said resilient means and held normally between said legs of said resilient means
   whereby movement of said operating lever means moves said cam means to outwardly extend said legs of said resilient means thereby to release the said legs from said reduced neck portion and thereby release the spool from said shaft and enable replacement thereof with another spool.

2. The spool mounting mechanism in a fishing reel, as set forth in claim 1, wherein said resilient means is a spring having a round shape portion of an inner circumference substantially equal to the outer circumference of said projection, and a pair of elements extending in parallel relation with one another integrally from said round shape portion.

* * * * *